United States Patent [19]

Sullivan et al.

[11] Patent Number: 5,367,496
[45] Date of Patent: Nov. 22, 1994

[54] APPARATUS FOR PRODUCING IMAGES ACOUSTICALLY

[75] Inventors: Michael J. Sullivan, Oakdale; Douglas G. Dussault, East Lyme; Rick H. Charette, Colchester; Ray E. D'Addio, Branford, all of Conn.

[73] Assignee: The United States of America as represented by the Secretary of the Navy, Washington, D.C.

[21] Appl. No.: 38,364

[22] Filed: Mar. 29, 1993

[51] Int. Cl.$^5$ .......................................... G03B 42/06
[52] U.S. Cl. .......................................... 367/7; 367/11
[58] Field of Search .................. 367/7, 11, 103, 105; 128/660.01, 660.07

[56] References Cited

U.S. PATENT DOCUMENTS 3,979,711 9/1976 Maginness et al. ............... 367/7

OTHER PUBLICATIONS

Buckingham, "Incoherent Imaging With Ambient Noise", Oceans 92: Mastering The Oceans Through Technology Proceedings; vol. 1, Oct. 26–29, 1992.

Buckingham et al., "Imaging the ocean with ambient noise", Nature, vol. 356, Mar. 26, 1992, pp. 327–329.
LeFee, "Method found to see by sound in ocean", San Diego Union-Tribune, Mar. 26, 1992, pp. B1 and B4.

Primary Examiner—Daniel T. Pihulic
Attorney, Agent, or Firm—Michael J. McGowan; Prithvi C. Lall; Michael F. Oglo

[57] ABSTRACT

Apparatus for imaging an object underwater. A detector array of operationally independent transducers is deployed in a medium such as water. Each transducer generates an electrical signal across independent first and second electrodes corresponding to impinging acoustic energy. Each of the positions in the detector array is identified in sequence along with the identification of a corresponding pixel position or display position in a display structure. A first multiplexer connects to all the first electrodes and a second multiplexer connects to all the second electrodes to enable the identification circuit to select corresponding electrodes for each detector position. A single amplifier circuit couples the signals from the multiplexer to a circuit for controlling the illumination of a selected display position.

15 Claims, 3 Drawing Sheets

APPARATUS FOR PRODUCING IMAGES ACOUSTICALLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to acoustic imaging and more specifically to apparatus for imaging objects using acoustic energy, particularly objects located underwater.

(2) Description of the Prior Art

Two basic approaches are used to produce visual representations of objects in an underwater environment that are characterized by various degrees of spatial resolution. Conventional underwater photographic apparatus provides the best spatial resolution. However, this apparatus relies on reflected energy in the visible light spectrum and therefore often requires separate light sources in order to obtain an image. Personnel may be required to operate the apparatus. Light transmission underwater, particularly in the oceans, is quite limited, so the range of any such photographic apparatus can be limited.

When an object is located in the ocean, wave and wind action produce acoustic energy that travels great distances. As a result, background acoustic energy is nearly always present from a source. Hydrophone detectors for monitoring acoustic energy in water are well known and can detect such acoustical energy at significant distances from the effective source. Such hydrophones typically include a piezoelectric or similar transducer that converts the acoustic energy into a corresponding electrical signal. In a simple form, a single hydrophone or multiple hydrophones deployed as listening devices merely detect sounds that objects make. Such apparatus does not obtain sufficient statistical information for producing a visual representation of an object.

Two-dimensional arrays of hydrophones can yield sufficient statistical information of spatial resolution that enables the image to depict the profile of an object. That is, if an object is located intermediate the effective source and the array, the object will block some acoustic energy from reaching portions of the array and the image will appear negatively on a display. Conversely, if an acoustic generator produces an energy pulse, acoustic energy reflected from the object will appear positively on a display. However, any such array must include a large number of elements to obtain sufficient statistical information to produce an image with any reasonable level of spatial resolution. It is also necessary to provide some selectivity in accepting energy in order to obtain any degree of selectivity with respect to a field of view.

Improved spatial and field of view selectivity resolution can be obtained if each hydrophone in the array drives a beam forming circuit. Beam forming circuits are essentially variable time delay circuits that produce discrete beams. However, beam forming circuits are expensive and each direction requires an independent beam forming circuit. Consequently when a large number of hydrophones, as required to obtain reasonable spatial resolution are used, the cost of the array and beamformer can become prohibitive. For example, if it were desired to provide an array that would have a spatial resolution of about one foot ($\frac{1}{2}$ wavelength at 5000 Hz), the array would require a detector about every six inches. A 100 foot by 100 foot array would require over 40,000 hydrophones and consequently over 40,000 beam forming circuits.

Ultrasound imaging apparatus used for medical diagnostics provides visual images that have reasonable spatial resolution as discussed in the following patents:

U.S. Pat. No. 4,434,658 (1984) Miyazaki et al
U.S. Pat. No. 4,511,998 (1985) Kanda et al
U.S. Pat. No. 4,596,145 (1986) Smith et al
U.S. Pat. No. 4,706,185 (1987) Karaki et al
U.S. Pat. No. 4,908,774 (1990) Lund et al In Miyazaki et al an ultrasonic energy source directs acoustic energy toward an object to be imaged. Acoustic energy passing then passes through an acoustic lens to be focused on a detector array. The detector array includes a piezoelectric transducer with a common electrode, a plurality of discrete planar electrodes spaced from the common electrode and piezoelectric material between the common electrode and the discrete electrodes. Each of the discrete electrodes connects through multiplexing and gating circuits to provide an input to an amplifier to produce imaging information for a visual display.

Kanda et al disclose a multi-element acoustic transducer for a scanning acoustic microscope. A first transducer generates a focused acoustic beam and a second transducer detects acoustic energy after it traverses an image. The acoustic transducers comprise an array of elements with a common electrode having an array of spherical portions formed on the surface thereof. A piezoelectric material coats this common electrode including the is spherical portions and individual spherical electrodes, organized according to the array attach to the other side of the piezoelectric material. The resulting laminated structure provides an array of piezoelectric transducers. A multiplexing network couples individual discrete electrodes to a single amplifier for subsequent processing to produce an image.

Smith et al disclose an acoustic imaging system for producing projection images of a three-dimensional volume by using transmitted acoustic pulses and a parallel signal processing apparatus. Signals generated by the transducers in response to received acoustic energy pass through a series of summing circuits, rectifying circuits, filter circuits, multiplier circuits and related circuits to be processed and produce the image.

Karaki et al disclose an apparatus for displaying ultrasonic images. An acoustic lens focuses the ultrasonic image on a detector array. Memories receive and store three ultrasonic images during each scan of an object thereby to enable the construction of a color image.

Lund et al disclose an ultrasonic system with a probe that moves over a surface of an object along a rectilinear scanning path. Signals received at each position are processed and stored in a corresponding memory position. Other circuitry utilizes the information in the memory to produce a visual display.

Although each of the foregoing patents discloses ultrasonic imaging apparatus for producing images of good spatial resolution in a medical environment, the technology in these patents is not readily adapted for underwater imaging applications. For example, ultrasonic imaging apparatus in medical diagnostics uses a very small field of view and is always proximate the object being imaged. It is not readily adapted for imaging large geographic areas with objects that are remote from the apparatus. Each of the disclosed apparatus is a "pulse-echo" type of apparatus in which an ultrasonic transducer generates an acoustical pulse and a detector array for receiving energy from the object. In many underwater imaging applications the generation of such a pulse is not desirable. Consequently apparatus including hydrophones, beam formers and other redundant and expensive circuitry has continued to be the apparatus of choice for underwater imaging even though it is complex, expensive and provides images of limited spatial resolution.

SUMMARY OF THE INVENTION

Therefore it is an object of this invention to provide apparatus for displaying underwater objects with improved spatial resolution.

Another object of this invention is to provide apparatus for underwater imaging that produces visual images of reasonable spatial resolution and that is simplified and less costly to produce than prior art apparatus.

Another object of this invention is to provide an underwater imaging system that is capable of providing visual images based upon ambient acoustic energy present in the water.

Still another object of this invention is to provide an apparatus for underwater imaging that is capable of operating in a variety of modes.

In accordance with this invention apparatus for producing visual image in response to acoustic energy received from an object includes a detector array of operationally independent transducers deployed in the medium. Each transducer converts impinging acoustic energy into an electrical output signal across first and second electrodes of the transducer. Other circuitry couples this array to a display that produces a visual image over an array of discrete pixel positions. An identification circuit sequentially establishes correspondence between each of the transducer and pixel positions. A multiplexer connects to the identification circuit and to each of the first and second electrodes of each of the transducers thereby to select a signal from a single transducer position for transfer to the input of a single amplifier. The output from this amplifier controls the intensity of the display at the corresponding pixel position. Other circuits establish the position of that pixel.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
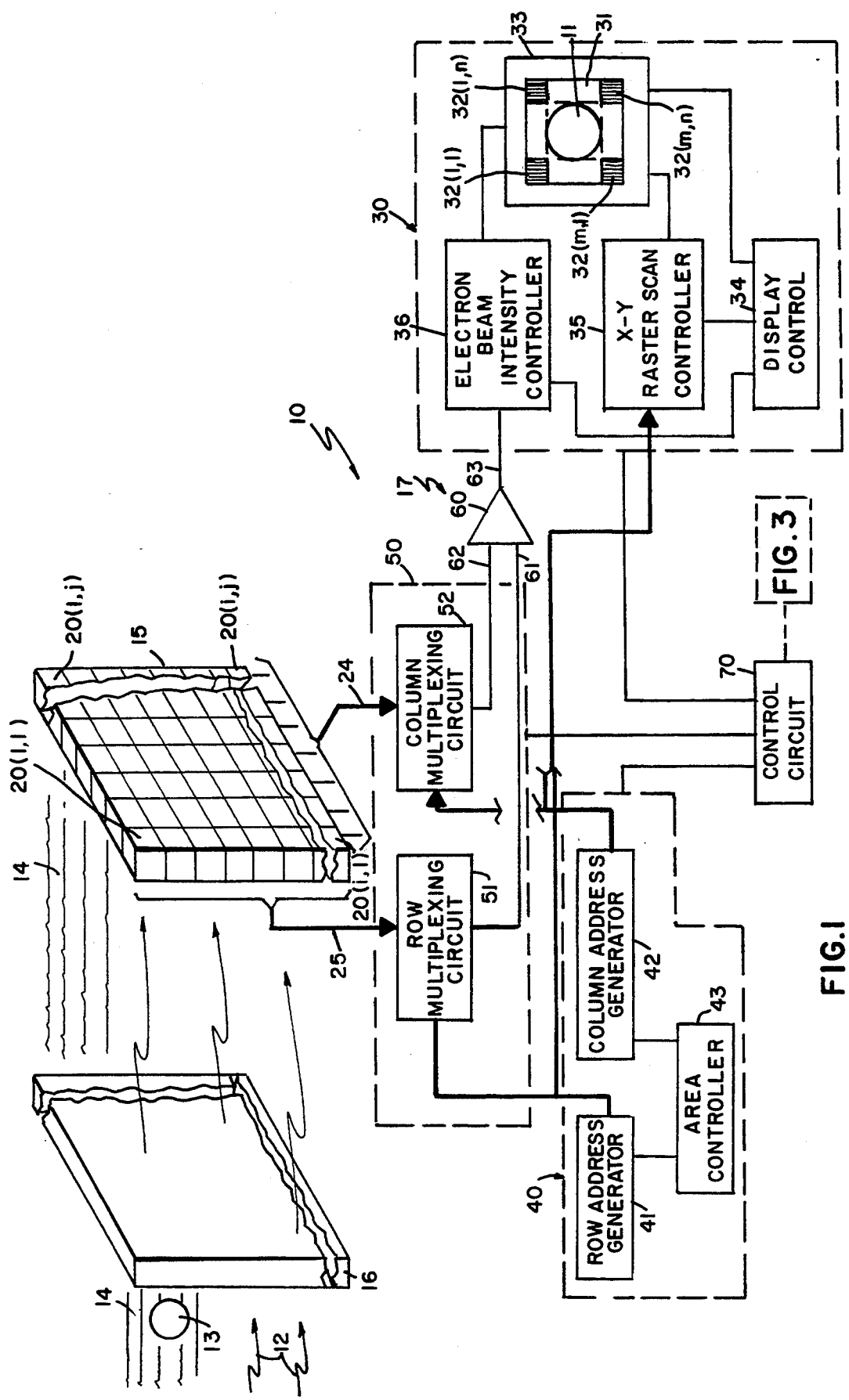
FIG. 1 is a schematic of apparatus for imaging objects underwater in accordance with this invention.

FIG. 1 discloses apparatus 10 that produces a visual image 11 in response to acoustic energy, represented by acoustic pressure waves 12 of an object 13 located in a medium 14 such as the ocean. A detector array 15 of discrete pressure transducers is located in the medium 14. Focusing apparatus 16 focuses acoustic energy onto the detector array 15. The focusing apparatus 16 can comprise an acoustic lens or an array of acoustic mirrors. Such acoustic lenses and mirrors are known in the art. A display circuit 17 receives each of these signals and produces the visual representation 11 of the object 13.

FIG. 1 and FIGS. 2A through 2D disclose one embodiment of a detector array 15 that comprises a plurality of independent discrete pressure transducers 20 (1,1) through 20 (i,j) arranged in an array of "i" rows and "j" columns. Each transducer is characterized by having independent first and second electrodes. In this specific embodiment, the detector array 15 comprises a central layer of piezoelectric material 21 and arrays of electrodes 22 and 23 formed on opposite sides of the piezoelectric material 21. Each of the electrodes 22 and 23 lie at predetermined row and column positions in the array. By way of example, a piezoelectric transducer 20(1,1) includes a first electrode 22 (1,1) and a second electrode 23(1,1). The electrode 22 (1,1) is spaced from each of adjacent electrodes 22(1,2), 22(2,1) and 22(2,2). Similarly the electrode 23(1,1) is spaced from each of its adjacent electrodes. Consequently the electrodes 22(1,1) and 23(1,1) and an intervening portion of the piezoelectric material 21 operate as a discrete transducer 20(1,1) independently of all the other transducers in the array 15.

Figure 2A:
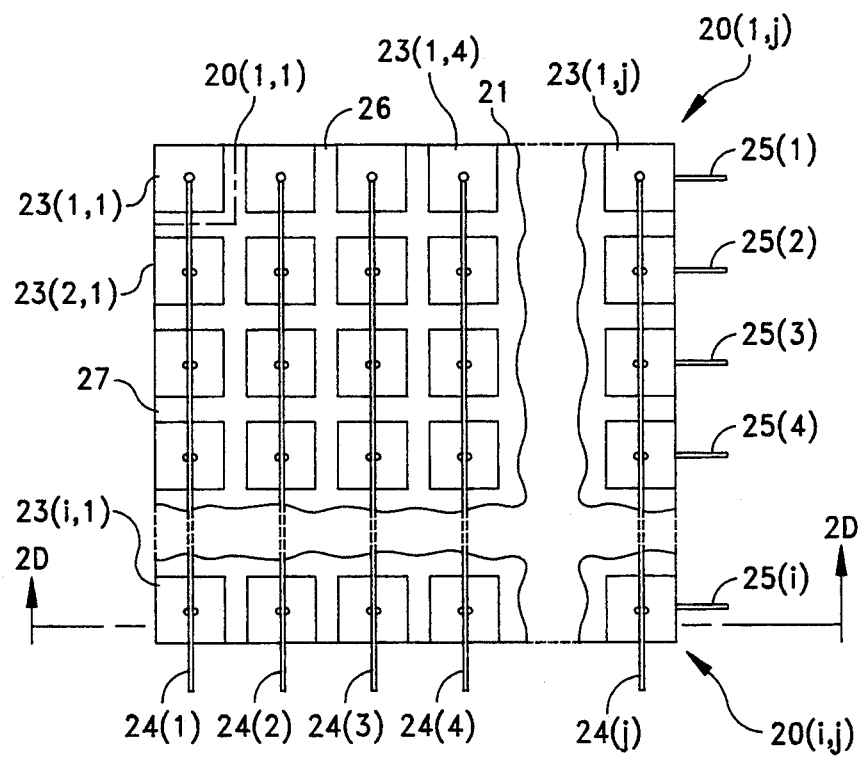
FIGS. 2A, 2B, 2C and 2D are front, back, side and top views of an embodiment of a detector array shown in FIG. 1.
Figure 2B:
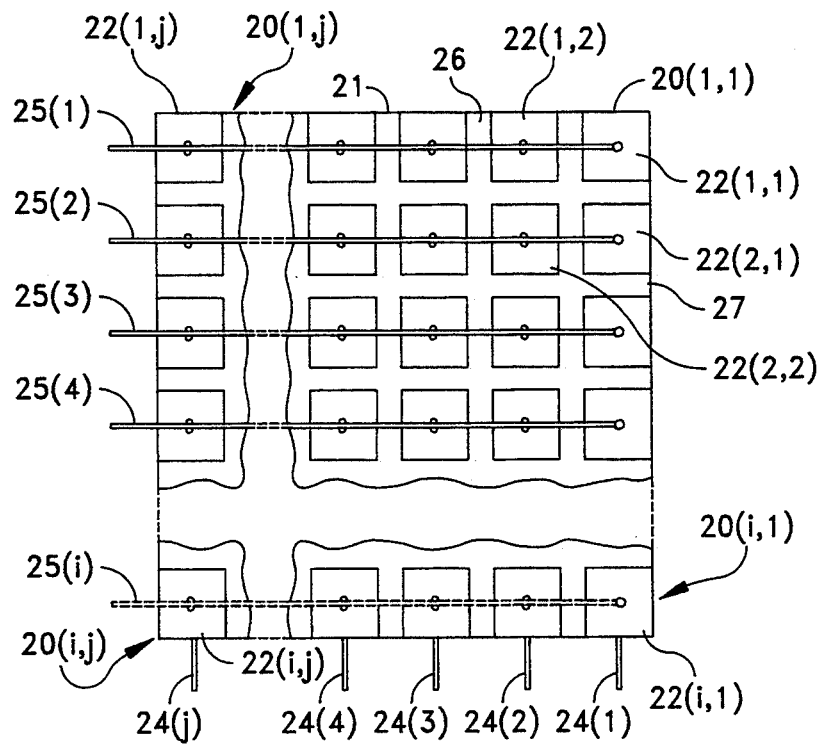
Figure 2C:
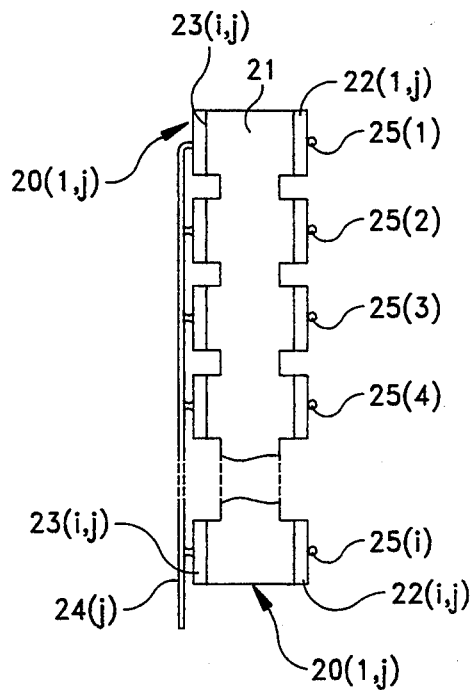
Figure 2D:
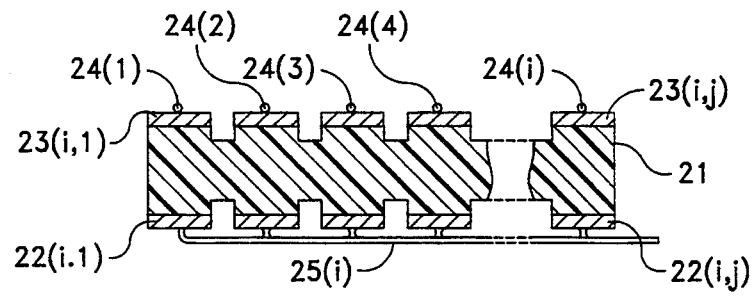

As shown in FIGS. 2A and 2B, column conductors 24 connect corresponding first electrodes 23 in different rows, but in the same columns, electrically in parallel. For example, column conductor 24(1) attaches to electrodes 23(1,1) through 23(i,1) while row conductor 24(j) connects to electrodes 23(1,j) through 23 (i,j). Similarly, row conductors 25 connect corresponding second electrodes 22 in a different column, but in the same row, electrically in parallel. Thus row conductor 25(1) attaches to the electrodes 22(1,1) through 22(1,j) while row conductor 25(i) connects to each of electrodes 22(i,1) through 22(i,j). Thus there is a row conductor 25 for each row of first electrodes 22 and a column conductor 24 for each row of second electrodes 23. This reduces the number of signal conductors from the array from (i*j) to (i+j).

Still referring to FIGS. 2A through 2D, sheets of conductive material attach over the parallel surfaces of a slab of piezoelectric material 21. A sawing operation then cuts a plurality of vertical grooves 26 to define columns and horizontal grooves 27 to define rows in the orientation of FIGS. 2A through 2D. These saw cuts may extend into the piezoelectric material 21 to improve the isolation between different sets of electrodes and the intermediate piezoelectric material 21. Consequently, the signals that appear on conductors 24(1) and 25(1) will, if measured independently of all the other conductors, represent the signal being produced by the transducer 20(1,1). Thus, the selection of any one of the row conductors 25(1) through 25(i) and any one of the column conductors 24(1) through 24(j) will effectively enable the selection of any of the individual positions 20 (1,1) through 20(i,j) in the detector array 15.

Just as the array 15 contains a plurality of rows and columns, a visual display 30 includes a visual screen 31 such as a cathode ray tube with an array of pixel positions designated 32(1,1) through 32(m,n) where $m \geq i$ and $n \geq j$. Such visual displays 30 are well known in the art. For purposes of this explanation FIG. 1 depicts the visual display 30 as additionally including directly related control circuitry 33 that is operated by a display control 34 and that includes x-y raster scan controller 35 and an electron beam intensity controller 36. As known, the x-y raster scan controller 35 provides pixel selection while in the electron beam intensity controller 36 controls the intensity of an electron beam striking a selected pixel and hence the brightness with which the pixel glows. If a display structure utilizes technology other than cathode-ray-tube technology, the modification of the circuitry shown in FIG. 1 to accommodate such technology is well known in the art.

An identification circuit 40 sequentially establishes correspondences between each of the transducers 20 in the detector array 15 and each of the pixel positions 32. The identification circuit 40 includes a row address generator 41 and a column address generator 42. Signals from the row address generator 41 and column address generator 42 are directed to a multiplexer circuit 50 and to the x-y raster scan controller 35 to thereby control the selection of the detector positions in the detector array 15 and the pixel positions on the screen 31. The identification circuit 40 may also include an area controller 43 for limiting the range through which the row address generator 41 and the column address generator 42 count thereby to display a subset of all the detectors 20 in the array 15 and produce a display over a corresponding subset of the pixel positions 32.

The multiplexing circuit 50 includes a row multiplexing circuit 51 and a column multiplexing circuit 52. The row multiplexing circuit 51 connects to the detector array 15 through the row conductors 25 and the column multiplexing circuit 52 connects to the detector array 15 through the column conductors 24. In operation row address generator 41 and column address generator 42 produce a predetermined sequence of numbers. For example, the following sequence of conductor selections might be used with a non-interlaced display:

| Sequence Number | Row Identification | Column Identification |
|---|---|---|
| 1 | 25(1) | 24(1) |
| 2 |  | 24(2) |
|  | ... |  |
| j |  | 24(j) |
| j + 1 | 25(2) | 24(1) |
| j + 2 |  | 24(2) |
|  | ... |  |
| 2 * j |  | 24(j) |
|  | ... |  |
| (i − 1) * j + 1 | 25(i) | 24(1) |
| (i − 1) * j + 2 |  | 24(2) |
|  | ... |  |
| (i * j) |  | 24(j) |

The row multiplexers essentially connect the selected one of row conductors 25 and column conductors 24 to their respective outputs. The signal developed between the outputs of the multiplexing circuits 51 and 52 therefore represents the acoustic energy received at the selected piezoelectric detector position in the array 15.

The multiplexing circuits 51 and 52 are simplified because the row multiplexing circuit 51 must only have "i" inputs and the column multiplexing circuit 52 must only have "j" inputs. This again reduces the total number of inputs to the multiplexing circuit 50 from (i,j) to (i+j). Moreover, the use of input row and multiplexing circuits and the use of independent discrete electrodes on both sides of the piezoelectric material enable the circuit to incorporate a single amplifier 60 with a first input 61 connected to the row multiplexing circuit 51 and a second input 62 connected to the column multiplexing circuit 52. An output electrode 63 then connects to the electron beam intensity controller 36 to produce an input display control signal that in turn controls the intensity with which the corresponding pixel position 32 in the display 30 glows.

A control circuit 70 connects to the display 33, the identification circuit 40 and the multiplexing circuit 50 to provide the necessary overall control and user interface functions and timing functions necessary to operate the apparatus 10. Such circuits are well known in the art.

As will now be apparent, the apparatus shown in FIG. 1 is adapted for producing an image 11 of an object 13 located in a medium 14. Ambient acoustical energy present within the medium 14 can enable the focusing apparatus 16 to focus the acoustic energy onto the detector array 15. The use of discrete piezoelectric transducers 20(1,1) through 20(i,j) with first and second independent electrodes simplify the multiplexing circuitry. Only one amplifying circuit is required. The numbers of components reduces dramatically. The requirements for establishing the correspondences between each position in the detector array and each pixel position on a display also are simplified.

The apparatus 10 in FIG. 1 allows images to be obtained passively. There is no need to generate a pulse. Moreover the combination of the focusing apparatus 16 and the detector array 15 enable the apparatus to "see" images over a defined field of view even when the images are at significant distances from the detector array 15 without the need for redundant electronic beam forming circuits.

Figure 3:
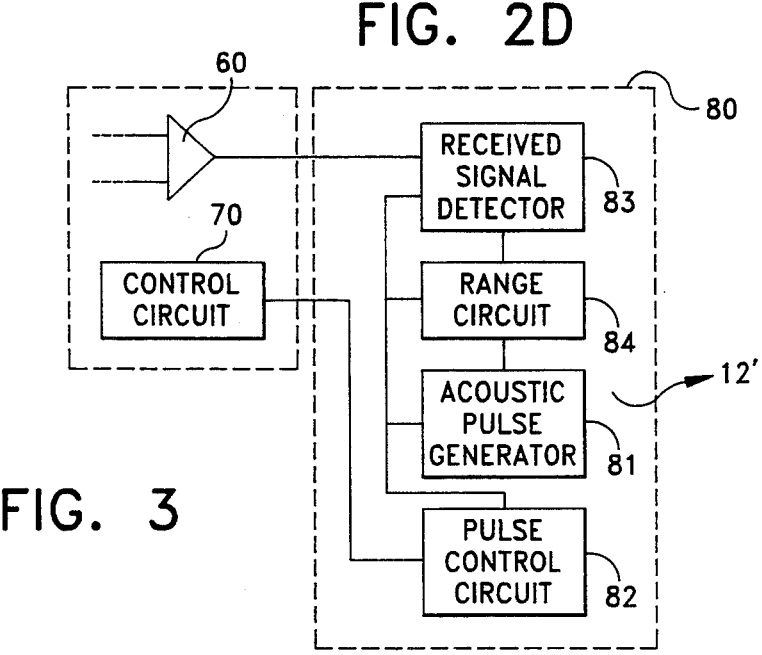
FIG. 3 is a schematic of apparatus that can be added to the apparatus shown in FIG. 1.

However, the circuitry of FIG. 1 can be modified to provide "pulse-echo" operation by the addition of the circuitry shown in FIG. 3 that connects to the control circuit 70 and amplifier 60. Referring to FIG. 3, a generator 81 produces an acoustic pulse 12' for "illuminating" an object in response to signals from the control circuit 70 and a pulse control circuit 82. The pulse generator 81 may connect to the detector 15 to drive that detector directly or to a separate transducer.

The circuitry in FIG. 3 can be further adapted to obtain range information by connecting a received signal detector 83 to the output of the amplifier 60 and a range circuit 84 to the received signal detector 83 thereby to use relative timing of the "pulse" and "echo" signals to obtain time delay information that converts to range. Such circuits are also well known in the art.

Therefore in accordance with the several objects of this invention, the apparatus shown in FIG. 1 is capable of providing an image based upon received acoustical information. Moreover, the simplification in the apparatus provided by this invention enables the number of positions in the detector array to be increased to provide sufficient statistical data to enable the display of images with reasonable spatial resolution without a concomitant increase in the complexity of the multiplexing circuits and amplifier circuits and without the need for beam forming circuits. Further the apparatus shown in FIG. 1 operates in a passive mode utilizing ambient noise as an imaging medium, but is capable of operating in an active mode with a pulse generator for obtaining increased statistical information.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus for producing a visual image in response to acoustic energy received from an object through a medium comprising:
   a detector array including a plurality of operationally independent, discrete transducer means deployed in the medium for connverging impinging acoustic energy into an electrical output signal across first and second electrodes thereof wherein said discrete transducer means are arrayed in rows and columns, focusing means for focusing received acoustic energy onto said detector array:
   display means for producing a visual display over an array of discrete pixel positions by energizing each pixel position in response to an input display control signal;
   identification means for sequentially establishing correspondences between each said transducer means and each said pixel position;
   multiplexing means connected to said identification means and said transducer means for coupling sequentially to outputs thereof the electrical output signal from a selected one of said transducer means, said multiplexing means including row multiplexing means and column multiplexing means wherein each input of said row multiplexing means connects to the first electrodes in a row of said transducer means and each input of said column multiplexing means connects to the second electrodes in a column of said transducer means, display control means connected to said identification means and said display means for selecting in sequence a said pixel position for energization in response to the input display control signal; and
   amplifier means connected to said multiplexing means and to said display means for producing the input display control signal in response to the electrical output signals from said multiplexing means whereby said sequential operation of said identification means produces an image on said display means corresponding to the image said focussing means forms on said detector array.

2. Apparatus as recited in claim 1 wherein said identification means includes row address generator means connected to said row multiplexing means, column address generator means connected to said column multiplexing means, and control means for sequencing said row and column address generator means for identifying individual transducer means in said detector array in sequence.

3. Apparatus as recited in claim 1 additionally comprising means connected to said row and column address generator means for limiting the range of addresses produced thereby to a subset of the transducer means in said detector array.

4. Apparatus as recited in claim 1 wherein said amplifier means includes a first input connected to the output of said row multiplexing means, a second input connected to the output of said column multiplexing means and an output connected to said display control means for producing the input display control signal.

5. Apparatus as recited in claim 4 wherein said display means comprises a cathode ray tube means having an array of pixel positions defined thereon, said display control means responding to each set of identification signals in sequence for selecting a said pixel position for being illuminated in response to the input display control signal derived from said selected transducer means.

6. Apparatus as recited in claim 1 additionally comprising generating means connected to said control means for transmitting acoustic energy to be reflected from the object through said focussing means to said detector array.

7. Apparatus as recited in claim 6 additionally comprising timing means responsive to said generating means and said detector array for determining the range of the object from said detector array.

8. Apparatus for producing a visual image of an underwater object in response to acoustic energy received from the object through the water, said apparatus comprising:
   a detector array of operationally discrete piezoelectric transducer means for receiving the acoustic energy, each said transducer means converting impinging acoustic energy into electrical output signals across first and second electrodes thereof and being positioned at the intersection of a predetermined row and column in said detector array;
   display means including means for displaying an image over an array of pixel positions thereon for being energized by an electron beam;
   beam positioning means for directing the electron beam to successive pixel positions and beam intensity control means for controlling the intensity of the beam striking the cathode ray tube at each pixel position;
   identification means for sequentially establishing correspondences between the position of each said transducer means and each pixel position of said display means;
   row and column multiplexing means connected to said identification means for selectively connecting one of a plurality of signal inputs to a signal output thereof, each said signal input of said row multiplexing means being connected to the first electrodes of said transducers in a corresponding row of the array and each said signal input of said column multiplexing means being connected to the second electrodes of said transducers in a corresponding column whereby the selection of a row and column produces signals at the outputs of said row and column multiplexing means corresponding to said transducer means at the intersection of the selected row and column in the array;
   amplifier means having first and second inputs connected to the signal outputs of said row and column multiplexing means respectively for producing a signal at the output thereof corresponding to the signal generated by the selected transducer means; and
   display control means connected to said identification means and said display means for selecting in sequence a said. pixel position for responding to the input position control signal derived from the selected transducer means whereby said image display means displays the object.

9. Apparatus as recited in claim 8 additionally comprising means for focussing acoustic energy onto said detector array.

10. Apparatus as recited in claim 9 wherein said detector array comprises first and second sets of spaced, parallel electrode means elongated along first and second, perpendicular, electrode axes, respectively, and a layer of piezoelectric material intermediate a plurality of said sets whereby intersecting portions of said first and second electrode sets form said independent piezoelectric transducer means.

11. Apparatus as recited in claim 10 wherein each of said electrode means comprises a plurality of electrodes spaced along a corresponding electrode axis and conductor means interconnecting the electrodes along a given axis.

12. Apparatus as recited in claim 10 wherein said identification means includes row address generator means connected to said row multiplexing means, column address generator means connected to said column multiplexing means, and control means for sequencing said row and column address generator means for identifying individual transducer means in said detector array in sequence.

13. Apparatus as recited in claim 12 additionally comprising means connected to said row and column address generator means for limiting the range of addresses produced thereby to a subset of the transducer means in said detector array.

14. Apparatus as recited in claim 12 generating means connected to said control means for transmitting acoustic energy to be reflected from the object through said focussing means to said detector array.

15. Apparatus as recited in claim 14 additionally comprising timing means responsive to said generating means and said detector array for determining the range of the object from said detector array.

* * * * *